US010537006B2

(12) United States Patent
Chen et al.

(10) Patent No.: US 10,537,006 B2
(45) Date of Patent: Jan. 14, 2020

(54) LED DRIVE CIRCUIT WITH LEAKAGE PROTECTION AND BALLAST COMPATIBILITY

(71) Applicant: XIAMEN BYMEA LIGHTING CO., LTD., Xiamen, Fujian (CN)

(72) Inventors: Longyin Chen, Fujian (CN); Shaolin Lian, Fujian (CN)

(73) Assignee: XIAMEN BYMEA LIGHTING CO., LTD., Xiamen (CN)

( * ) Notice: Subject to any disclaimer, the term of this patent is extended or adjusted under 35 U.S.C. 154(b) by 0 days.

(21) Appl. No.: 16/045,207

(22) Filed: Jul. 25, 2018

(65) Prior Publication Data

US 2019/0373702 A1 Dec. 5, 2019

(51) Int. Cl.
*H05B 33/08* (2006.01)

(52) U.S. Cl.
CPC ..... *H05B 33/0887* (2013.01); *H05B 33/0809* (2013.01)

(58) Field of Classification Search
None
See application file for complete search history.

(56) References Cited

U.S. PATENT DOCUMENTS

| | | | | |
|---|---|---|---|---|
| 8,957,662 B2 * | 2/2015 | Newman, Jr. | ...... | H05B 33/0815 323/300 |
| 8,988,058 B2 * | 3/2015 | Newman, Jr. | ...... | H05B 33/0815 323/300 |
| 9,173,270 B2 * | 10/2015 | Liao | ...... | H05B 33/0884 |
| 9,220,157 B2 * | 12/2015 | Newman, Jr. | ...... | H02M 7/06 |
| 9,343,997 B2 * | 5/2016 | Newman, Jr. | ...... | H05B 33/0815 |
| 9,356,531 B2 * | 5/2016 | Newman, Jr. | ...... | H02M 1/081 |
| 9,420,663 B1 * | 8/2016 | Hsia | ...... | H02M 1/32 |
| 9,426,856 B2 * | 8/2016 | Shteynberg | ...... | H05B 33/083 |
| 9,480,193 B2 * | 10/2016 | Vermeir | ...... | H05B 33/0887 |
| 9,609,701 B2 * | 3/2017 | Melanson | ...... | H05B 33/0815 |
| 9,689,536 B2 * | 6/2017 | Xiong | ...... | F21V 3/061 |
| 9,699,849 B2 * | 7/2017 | O'Neil | ...... | H05B 33/0845 |
| 9,788,390 B2 * | 10/2017 | Park | ...... | H05B 33/0803 |
| 9,872,360 B2 * | 1/2018 | Xu | ...... | H01H 36/00 |
| 9,941,811 B2 * | 4/2018 | Newman, Jr. | ...... | H02M 1/081 |
| 10,054,271 B2 * | 8/2018 | Xiong | ...... | F21V 3/061 |
| 10,128,772 B2 * | 11/2018 | Newman, Jr. | ...... | H02M 1/081 |
| 2014/0103826 A1 * | 4/2014 | Newman, Jr. | ...... | H05B 33/0815 315/200 R |

(Continued)

*Primary Examiner* — Dion Ferguson
*Assistant Examiner* — Srinivas Sathiraju
(74) *Attorney, Agent, or Firm* — Cooper Legal Group, LLC

(57) ABSTRACT

An LED drive circuit with leakage protection and ballast includes a first filtering circuit, a rectifying circuit, a power module, a second filtering circuit, a compatibility and leakage protection circuit and a LED load, the input of the first filtering circuit is connected to a power input, the output of the first filtering circuit is connected to the input of the rectifying circuit, the output of the rectifying circuit is connected to the input of the second filtering circuit, the output of the second filtering circuit is connected to the input of the power module, the output of the power module is connected to the LED load, the input of the compatibility and leakage protection circuit is connected to the input of the rectifying circuit and the input of the second filtering circuit, and the output of the compatibility and leakage protection circuit is connected to the rectifying circuit output.

10 Claims, 3 Drawing Sheets

(56) References Cited

U.S. PATENT DOCUMENTS

| | | | | |
|---|---|---|---|---|
| 2016/0150604 A1* | 5/2016 | Grajcar | ............. | H05B 33/0809 |
| | | | | 315/122 |
| 2016/0255685 A1* | 9/2016 | Melanson | .......... | H05B 33/0815 |
| | | | | 327/109 |
| 2016/0270173 A1* | 9/2016 | Xiong | ................ | H05B 33/0815 |
| 2016/0345403 A1* | 11/2016 | Hsia | .................. | H05B 33/0887 |
| 2017/0034879 A1* | 2/2017 | Shteynberg | .......... | H05B 33/083 |
| 2017/0079115 A1* | 3/2017 | Hsia | ........................ | F21K 9/278 |
| 2017/0089525 A1* | 3/2017 | Xiong | .................... | F21V 3/061 |
| 2017/0094747 A1* | 3/2017 | Wang | ................ | H05B 33/0809 |
| 2017/0171937 A1* | 6/2017 | Hsia | .................. | H05B 33/0887 |
| 2017/0245341 A1* | 8/2017 | Lee | .................... | H05B 37/0272 |
| 2017/0321849 A1* | 11/2017 | Xiong | .................... | F21V 3/061 |
| 2017/0359881 A1* | 12/2017 | Hsia | ........................ | H02M 1/32 |
| 2018/0124889 A1* | 5/2018 | Xiong | .................... | F21V 3/061 |
| 2018/0368233 A1* | 12/2018 | Xiong | .................... | F21K 9/278 |
| 2019/0032864 A1* | 1/2019 | Xiong | ............... | H05B 33/0857 |

* cited by examiner

LED DRIVE CIRCUIT WITH LEAKAGE PROTECTION AND BALLAST COMPATIBILITY

TECHNICAL FILED

The present invention relates to LED drive circuit with leakage protection and ballast compatibility.

RELATED ART

LED is a semiconductor illumination tool that it replaces the traditional illuminations. The LED illuminations has advantages of energy saving and emission reduction, security and environmental protection, long service life, high illumination efficiency, etc. Traditional illuminations like fluorescent lamps need ballast drivers, so the LED can not be directly assembled to the fluorescent lamps. The existing ballasts need to be removed, and the circuit of the lamp needs to be changed. In other case, the traditional fluorescent lamps are replaced by specified LED lamps. However, as the ballast of the fluorescent lamp has a limited service life, once the useful life is ended, the lamps must be changed to which the electric supply is available, the circuit also needs to be changed. The labor cost is an unnecessary cost.

In addition, during the assembly or the maintenance of the LED lamps, one input of the LED drive circuit is connected to the electric supply and another input that is not connected to the electric supply is contact with the human being, so current leakage may happen, resulting in potential risk.

SUMMARY OF THE INVENTION

The present invention is provided with a LED drive circuit with leakage protection and ballast compatibility to overcome the disadvantages of the existing known technology. The technical proposal of the present invention is that:

LED drive circuit with leakage protection and ballast compatibility, wherein comprising a first filtering circuit, a rectifying circuit, a power module, a second filtering circuit, a compatibility and leakage protection circuit and a LED load, the input of the first filtering circuit is connected to a power input, the output of the first filtering circuit is connected to the input of the rectifying circuit, the output of the rectifying circuit is connected to the input of the second filtering circuit, the output of the second filtering circuit is connected to the input of the power module, the output of the power module is connected to the LED load, the input of the compatibility and leakage protection circuit is connected to the input of the rectifying circuit and the input of the second filtering circuit, and the output of the compatibility and leakage protection circuit is connected to the output of the rectifying circuit.

In another preferred embodiment, the compatibility and leakage protection circuit comprises a main control chip JU1, a first connector, a second connector, a fourth connector and a third connector, the main control chip JU1 comprises a first pin and a second pin, the first pin is connected to the second connector by a diode JD3 and a diode JD4, the second pin is connected to the positive pole of the diode JD3 by a resistor JR5, the rectifying circuit is a rectifier bridge, the rectifier bridge comprises a first rectifying input, a second rectifying input, a first rectifying output and a second rectifying output, the second connector is connected to the first rectifying input to detect the waveform and frequency of the voltage of the first rectifying input;

the main control chip JU1 further comprises a seventh pin and a eighth pin, the eighth pin is connected to the first connector by a diode JD1, a resistor JR2 and a resistor JR1, the seventh pin is connected to the eighth pin by a capacitor JC1, the first connector is connected to the second rectifying input to detect the waveform and frequency of the second rectifying input;

the main control chip JU1 compares the waveform and frequency of the voltage of the first rectifying input and the second rectifying input with a preset value to judge the type of the input power so as to determine whether to connect the current of the fourth connector and the third connector.

In another preferred embodiment, the main control chip JU1 further comprises a third pin, a fourth pin, a fifth pin and a sixth pin, the third pin is connected to the third connector by a resistor JR7 and a resistor JR8, the fourth pin is connected to the third connector by a resistor JR9 and a diode JD2 parallel connected, the resistor JR9 and diode JD2 parallel connected are parallel connected to the resistor JR8, the third connector is connected to the first rectifying output, the fifth pin is connected to the sixth pin and then is connected to the fourth connector, the fourth connector is connected to the input of the second filtering circuit, the main control chip JU1 detects the current flowing from the second filtering circuit to the fourth connector then to the third connector when the LED drive circuit is powered on, compares the detected transient current with the preset value to judge whether there is a human being entering and whether to cut off the current of the fourth connector and the third connector.

In another preferred embodiment, the compatibility and leakage protection circuit further comprises a clamping diode D3 with the positive pole and the negative pole respectively connected to the third connector and the fourth connector.

In another preferred embodiment, the first filtering circuit comprises a capacitor C7 and a fuse FUSE, the input power has an L port and a N port, one end of the fuse FUSE is connected to the L port of the input power, the other end of the fuse FUSE is connected to the capacitor C7 and the second rectifying input, the other end of the capacitor C7 is connected to the N port of the input power and the first rectifying input.

In another preferred embodiment, the second filtering circuit comprises an inductor L1, a resistor R1, a capacitor C2, an inductor L2 and a resistor R9, the resistor R1 is parallel connected to the inductor L1 and one end of the inductor L1 is connected to the second rectifying output, the other end of the inductor L1 is connected to the input of the power module, one end of the capacitor C2 is connected to the other end of the inductor L1, the inductor L2 is parallel connected to the resistor R9 and one end of the inductor L2 is connected to the other end of the capacitor C2, the other end of the inductor L2 is connected to the inductor L1 by the capacitor C1 and is directly connected to the fourth connector.

In another preferred embodiment, the power module comprises a chip U1, a start branch, a capacitor C4, a capacitor C3, a free wheeling diode D2, a parallel resistor array RR1, an inductor L3, a resistor R7, a resistor R6, a diode D2, a filtering capacitor EC1 and a resistor R8; the chip U1 has a first pin, a second pin, a third pin, a fourth pin, a fifth pin, a sixth pin, a seventh pin and a eighth pin; one end of the start branch is connected to the output of the second filtering circuit and the capacitor C3, the other end of the start branch is grounded, the capacitor C3 is connected to the inductor L3, the filtering capacitor EC1, the resistor R8 and the positive pole of the LED load, the other end of the filtering capacitor EC1 and the resistor R8 are connected to the negative pole of the LED load, the center of the inductor L3 is connected to the resistor R7 and the positive pole of the diode D2, the other end of the resistor R7 is connected to the eighth pin, the negative pole of the diode D2 is connected to the resistor R6, the other end of the resistor R6 is connected to the start branch and the first pin, the second pin is grounded, the third pin and the fourth pin are connected to the capacitor C3, two ends of the capacitor C4 are respectively connected to the seventh pin and the ground, the sixth pin and the fifth pin are connected and connected to the parallel resistor array RR1 and the negative pole of the free-wheeling diode D1, the positive pole of the free-wheeling diode D1 is grounded, the other end of the parallel resistor array RR1 is connected to the inductor L3.

Compared to the existing known technology, the present invention has advantages as follows: The LED drive circuit has high compatibility that it is not only available for main power input, but also available for ballast; the circuit can judge if there is a human being entering to make sure the security of the operation persons; the circuit is simplified with multiple functions that the materials and manufacturing cost are reduced, providing high manufacturing efficiency.

BRIEF DESCRIPTION OF THE DRAWINGS

The present invention will be further described with the drawings and the embodiments.

DETAILED DESCRIPTION OF THE EMBODIMENT

Figure 1:
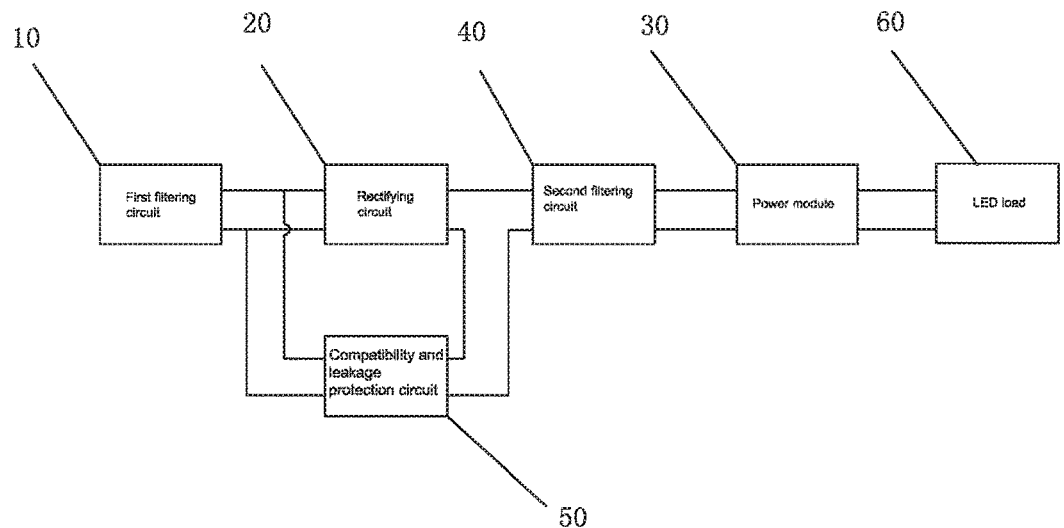
FIG. 1 illustrates a flow chart of the LED drive circuit.
Figure 2:
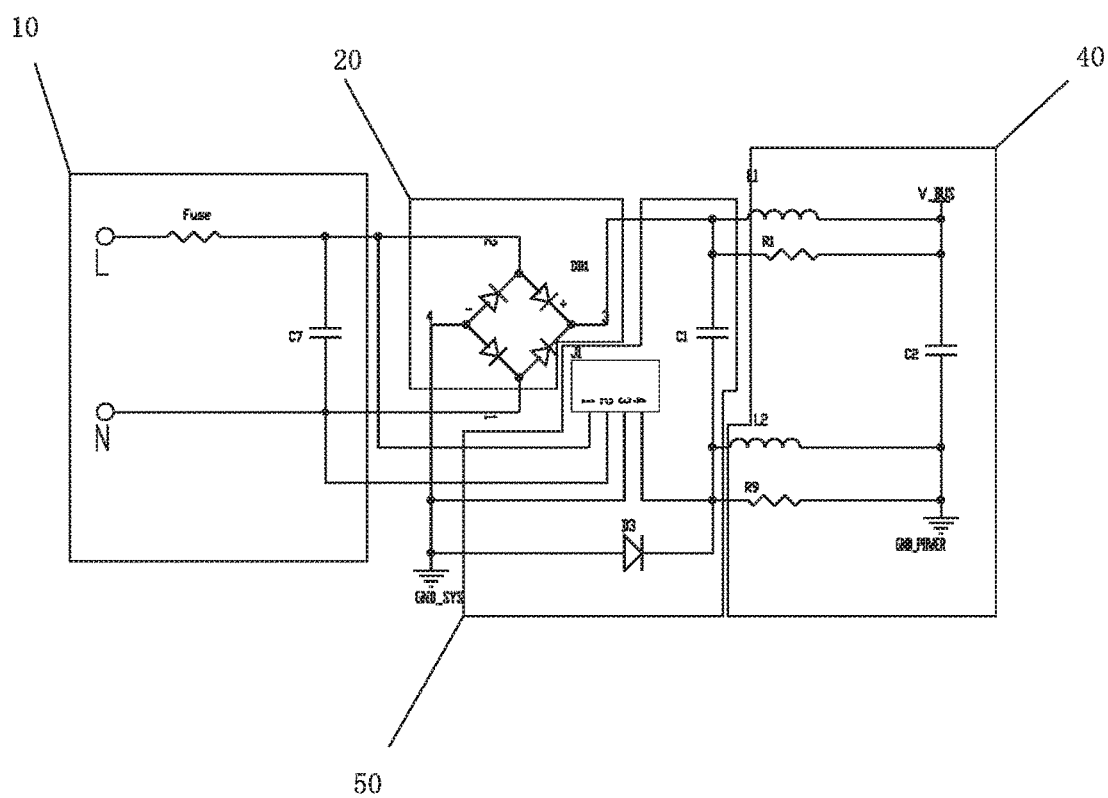
FIG. 2 illustrates a circuit diagram of the first filtering circuit, the rectifying circuit, the compatibility and leakage protection circuit and the second filtering circuit.
Figure 3:
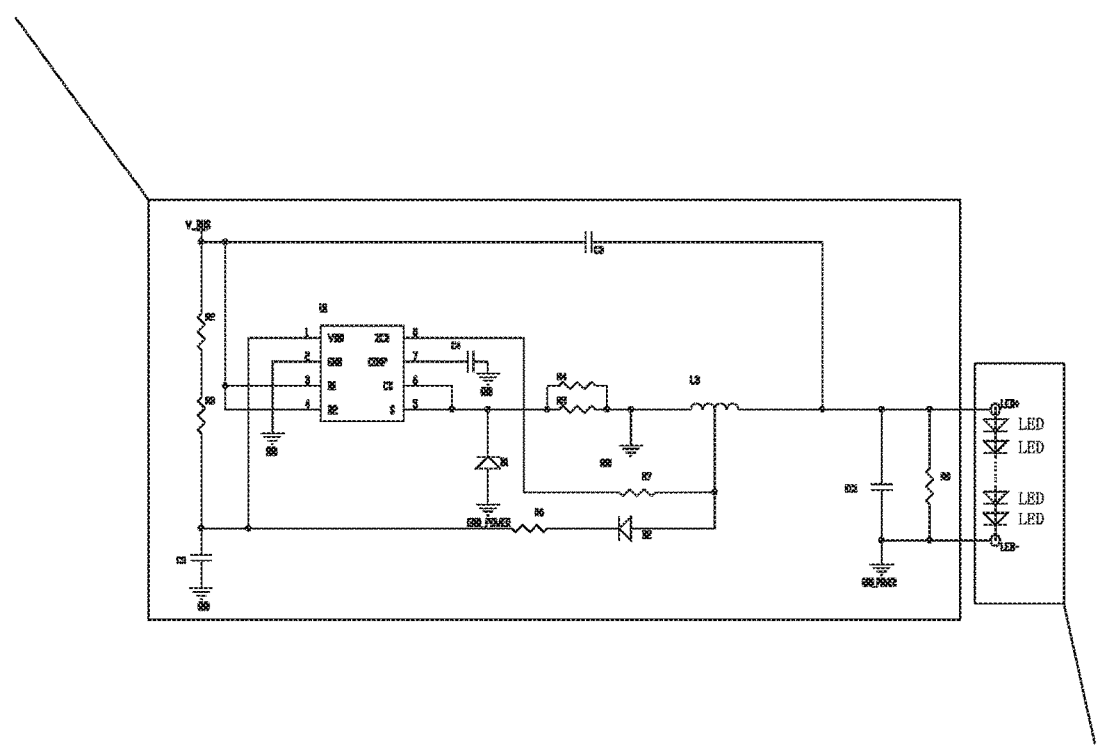
FIG. 3 illustrates a circuit diagram of the power module and the LED load.
Figure 4:
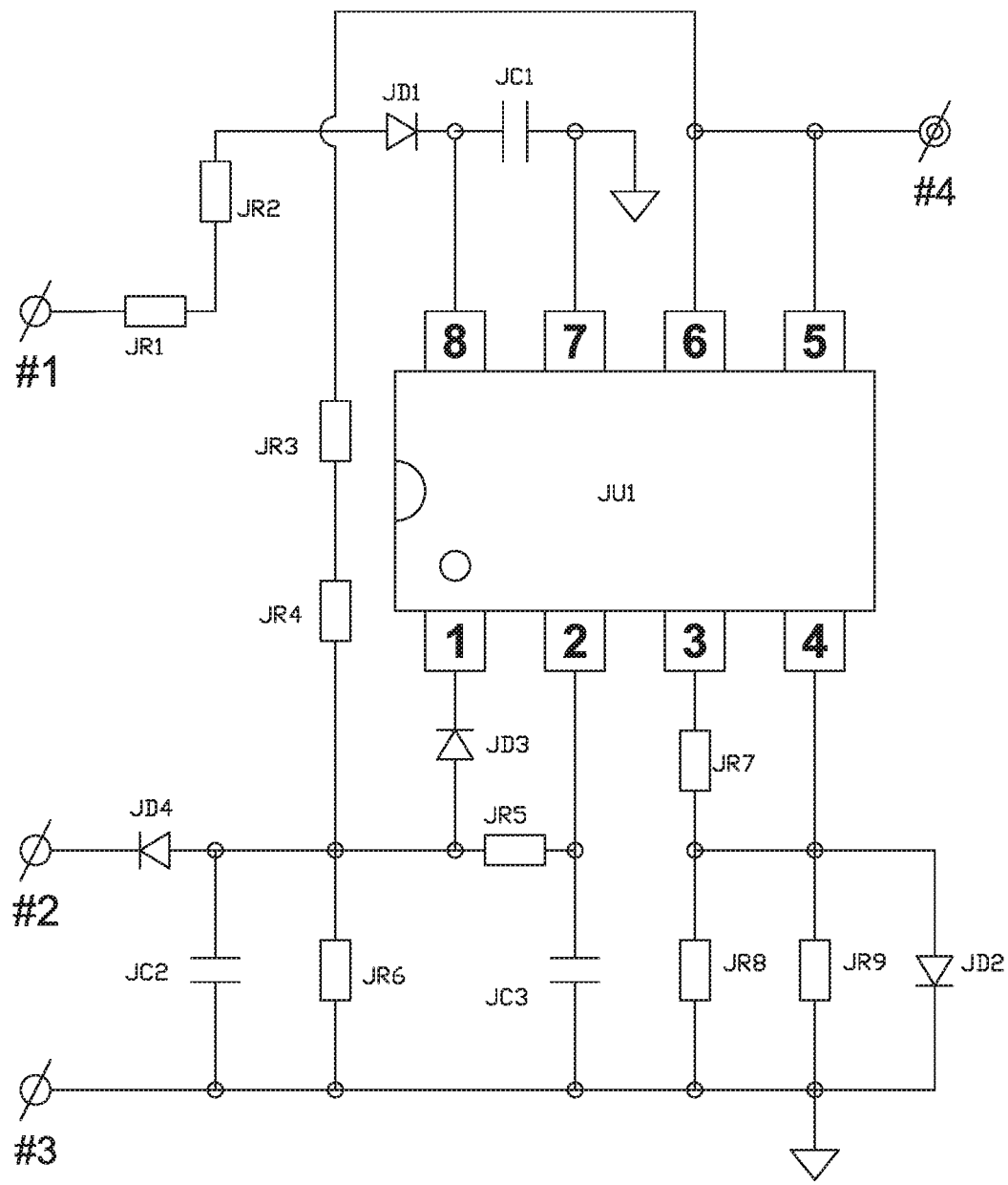
FIG. 4 illustrates a circuit diagram of the compatibility and leakage protection circuit.

Referring to FIGS. 1-4, a preferred embodiment of an LED drive circuit with leakage protection and ballast compatibility comprises a first filtering circuit 10, a rectifying circuit 20, a power module 30, a second filtering circuit 40, a compatibility and leakage protection circuit 50 and a LED load 60.

The input of the first filtering circuit 10 is connected to a power input, the output of the first filtering circuit 10 is connected to the input of the rectifying circuit 20, the output of the rectifying circuit 20 is connected to the input of the second filtering circuit 40, the output of the second filtering circuit 40 is connected to the input of the power module 30, the output of the power module 30 is connected to the LED load 60, the input of the compatibility and leakage protection circuit 50 is connected to the input of the rectifying circuit 20 and the input of the second filtering circuit, and the output of the compatibility and leakage protection circuit is connected to the output of the rectifying circuit 20. The input power has an L port and a N port. The input power can be a ballast input or the electric supply.

The rectifying circuit 20 is a rectifier bridge, the rectifier bridge comprises a first rectifying input, a second rectifying input, a first rectifying output and a second rectifying output.

The compatibility and leakage protection circuit 50 comprises a main control chip JU1, a first connector, a second connector, a fourth connector and a third connector, the main control chip JU1 comprises a first pin, a second pin, a third pin, a fourth pin, a fifth pin, a sixth pin, a seventh pin and an eighth pin. In this embodiment, the first connector, the second connector and the fourth connector are inputs, the third connector is an output.

The first filtering circuit 10 comprises a capacitor C7 and a fuse FUSE, one end of the fuse FUSE is connected to the L port of the input power, the other end of the fuse FUSE is connected to the capacitor C7, the second rectifying input, and the first connector, the other end of the capacitor C7 is connected to the N port of the input power, the first rectifying input and the second connector.

In this embodiment, the first pin is connected to the second connector by a diode JD3 and a diode JD4, the negative pole of the diode JD3 is connected to the first pin, the positive pole of the diode JD3 is connected to the positive pole of the diode JD4, the negative pole of the diode JD4 is connected to the second connector. The second pin is connected to the positive pole of the diode JD3 by a resistor JR5, the second connector is connected to the first rectifying input to detect the waveform and frequency of the voltage of the first rectifying input;

The eighth pin is connected to the first connector by a diode JD1, a resistor JR2 and a resistor JR1, the positive pole of the diode JD1 is connected to the resistor JR2, the negative pole of the diode JD1 is connected to the eighth pin, the resistor JR2 is series connected to the resistor JR1, the resistor JR1 is connected to the first connector.

The seventh pin is connected to the eighth pin by a capacitor JC1, the first connector is connected to the second rectifying input to detect the waveform and frequency of the second rectifying input;

The main control chip JU1 compares the waveform and frequency of the voltage of the first rectifying input and the second rectifying input with a preset value to judge the type of the input power so as to determine whether to connect the current of the fourth connector and the third connector.

The third pin is connected to the third connector by a resistor JR7 and a resistor JR8, the resistor JR7 and the resistor JR8 are series connected.

The fourth pin is connected to the third connector by a resistor JR9 and a diode JD2 parallel connected, the resistor JR9 and diode JD2 parallel connected are parallel connected to the resistor JR8, the third connector is connected to the first rectifying output; in this embodiment, the positive pole of the diode JD2 is connected to the fourth pin, the negative pole of the diode JD2 is connected to the third connector.

The fifth pin is connected to the sixth pin and then is connected to the fourth connector, the fourth connector is connected to the input of the second filtering circuit, the main control chip JU1 detects the current flowing from the second filtering circuit to the fourth connector then to the third connector when the LED drive circuit is powered on, compares the detected transient current with the preset value to judge whether there is a human being entering and whether to cut off the current of the fourth connector and the third connector.

In this embodiment, the compatibility and leakage protection circuit further comprises a clamping diode D3 with the positive pole and the negative pole respectively connected to the third connector and the fourth connector.

The second filtering circuit comprises an inductor L1, a resistor R1, a capacitor C2, an inductor L2 and a resistor R9, the resistor R1 is parallel connected to the inductor L1 and one end of the inductor L1 is connected to the second rectifying output, the other end of the inductor L1 is connected to the input of the power module, one end of the capacitor C2 is connected to the other end of the inductor L1, the inductor L2 is parallel connected to the resistor R9 and one end of the inductor L2 is connected to the other end of the capacitor C2, the other end of the inductor L2 is connected to the inductor L1 by the capacitor C1 and is directly connected to the fourth connector. The power module comprises a chip U1, a start branch, a capacitor C4, a capacitor C3, a free wheeling diode D2, a parallel resistor array RR1, an inductor L3, a resistor R7, a resistor R6, a diode D2, a filtering capacitor EC1 and a resistor R8; the chip U1 has a first pin, a second pin, a third pin, a fourth pin, a fifth pin, a sixth pin, a seventh pin and a eighth pin; one end of the start branch is connected to the output of the second filtering circuit and the capacitor C3, the other end of the start branch is grounded, the capacitor C3 is connected to the inductor L3, the filtering capacitor EC1, the resistor R8 and the positive pole of the LED load, the other end of the filtering capacitor EC1 and the resistor R8 are connected to the negative pole of the LED load, the center of the inductor L3 is connected to the resistor R7 and the positive pole of the diode D2, the other end of the resistor R7 is connected to the eighth pin, the negative pole of the diode D2 is connected to the resistor R6, the other end of the resistor R6 is connected to the start branch and the first pin, the second pin is grounded, the third pin and the fourth pin are connected to the capacitor C3, two ends of the capacitor C4 are respectively connected to the seventh pin and the ground, the sixth pin and the fifth pin are connected and connected to the parallel resistor array RR1 and the negative pole of the free-wheeling diode D1, the positive pole of the free-wheeling diode D1 is grounded, the other end of the parallel resistor array RR1 is connected to the inductor L3.

In this embodiment, the parallel resistor array RR1 comprises a resistor R4 and a resistor R5.

In this embodiment, the start branch comprises a resistor R2, a resistor R3 and a capacitor C5 series connected; the resistor R2 is connected to the capacitor C3, the resistor R6 and the capacitor C5 are connected to the resistor R3.

The LED drive circuit works like this:

Step 10, the main control chip JU1 detects the waveform and frequency of the voltage of the second rectifying input of the rectifying circuit by the first connector and the waveform and frequency of the voltage of the first rectifying input of the rectifying circuit by the second connector;

Step 20, the main control chip JU1 compares the waveform and frequency of the voltage of the first rectifying input and the second rectifying input with a preset value to judge the type of the input power so as to determine whether to connect the current of the fourth connector and the third connector;

If the waveform and frequency of the voltage of the first rectifying input and the second rectifying input are larger than the preset values, the input power is the ballast, the main control chip JU1 connects the fourth connector and the third connector;

If the waveform and frequency of the voltage of the first rectifying input and the second rectifying input are smaller than the preset values, the input power is the electric supply, the main control chip JU1 issues the step 30;

Step 30, the main control chip JU1 detects the current flowing from the second filtering circuit to the fourth connector then to the third connector when the LED drive circuit is powered on, compares the detected transient current with the preset value to judge whether there is a human being entering and whether to cut off the current of the fourth connector and the third connector;

If the detected transient current is smaller than the preset value, there is a human being entering, the current of the fourth connector and the third connector are cut off;

If the detected transient current is larger than the preset value, no human being enters, the current of the fourth connector and the third connector are connected.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A light emitting diode (LED) drive circuit with leakage protection and ballast compatibility, comprising: a first filtering circuit, a rectifying circuit, a power module, a second filtering circuit, a compatibility and leakage protection circuit and a LED load, an input of the first filtering circuit is connected to an input power, an output of the first filtering circuit is connected to an input of the rectifying circuit, an output of the rectifying circuit is connected to an input of the second filtering circuit, an output of the second filtering circuit is connected to an input of the power module, an output of the power module is connected to the LED load, an input of the compatibility and leakage protection circuit is connected to the input of the rectifying circuit and the input of the second filtering circuit, and an output of the compatibility and leakage protection circuit is connected to the output of the rectifying circuit, wherein:

the compatibility and leakage protection circuit comprises a main control chip, a first connector, a second connector, a third connector and a fourth connector, the main control chip comprises a first pin and a second pin, the first pin of the main control chip is connected to the second connector by a first diode and a second diode, the second pin of the main control chip is connected to a positive pole of the first diode by a first resistor, the rectifying circuit is a rectifier bridge, the rectifier bridge comprises a first rectifying input, a second rectifying input, a first rectifying output and a second rectifying output, the second connector is connected to the first rectifying input to detect a waveform and a frequency of a voltage of the first rectifying input, the main control chip further comprises a seventh pin and an eighth pin, the eighth pin of the main control chip is connected to the first connector by a third diode, a second resistor and a third resistor, the seventh pin of the main control chip is connected to the eighth pin of the main control chip by a first capacitor, the first connector is connected to the second rectifying input to detect a waveform and a frequency of a voltage of the second rectifying input, and the main control chip compares the waveform and the frequency of the voltage of the first rectifying input and the waveform and the frequency of the voltage of the second rectifying input with a preset value to judge a type of the input power so as to determine whether to connect a current of the third connector and the fourth connector.

2. The LED drive circuit with leakage protection and ballast compatibility according to claim 1, wherein the main control chip further comprises a third pin, a fourth pin, a fifth pin and a sixth pin, the third pin of the main control chip is connected to the third connector by a fourth resistor and a fifth resistor, the fourth pin of the main control chip is parallel connected to the third connector by a sixth resistor and a fourth diode, the sixth resistor and fourth diode are parallel connected to the fifth resistor, the third connector is connected to the first rectifying output, the fifth pin of the main control chip is connected to the sixth pin of the main control chip and then is connected to the fourth connector, the fourth connector is connected to the input of the second filtering circuit, the main control chip detects a current flowing from the second filtering circuit to the fourth connector then to the third connector when the LED drive circuit is powered on, compares a detected transient current with the preset value to judge whether there is a human being entering and whether to cut off the current of the third connector and the fourth connector.

3. The LED drive circuit with leakage protection and ballast compatibility according to claim 2, wherein the compatibility and leakage protection circuit further comprises a clamping diode with a positive pole and a negative pole respectively connected to the third connector and the fourth connector.

4. The LED drive circuit with leakage protection and ballast compatibility according to claim 2, wherein the first filtering circuit comprises a second capacitor and a fuse, the input power has an L port and an N port, a first end of the fuse is connected to the L port of the input power, a second end of the fuse is connected to a first end of the second capacitor and the second rectifying input, a second end of the second capacitor is connected to the N port of the input power and the first rectifying input.

5. The LED drive circuit with leakage protection and ballast compatibility according to claim 2, wherein the second filtering circuit comprises a first inductor, a seventh resistor, a third capacitor, a second inductor and an eighth resistor, the seventh resistor is parallel connected to the first inductor and a first end of the first inductor is connected to the second rectifying output, a second end of the first inductor is connected to the input of the power module, a first end of the third capacitor is connected to the second end of the first inductor, the second inductor is parallel connected to the eighth resistor and a first end of the second inductor is connected to a second end of the third capacitor, a second end of the second inductor is connected to the first inductor by a fourth capacitor and is directly connected to the fourth connector.

6. The LED drive circuit with leakage protection and ballast compatibility according to claim 2, wherein the power module comprises a chip, a start branch, a fifth capacitor, a sixth capacitor, a free-wheeling diode, a parallel resistor array, a third inductor, a ninth resistor, a tenth resistor, a fifth diode, a filtering capacitor and an eleventh resistor; the chip has a first pin, a second pin, a third pin, a fourth pin, a fifth pin, a sixth pin, a seventh pin and an eighth pin; a first end of the start branch is connected to the output of the second filtering circuit and the sixth capacitor, a second end of the start branch is grounded, a first end of the sixth capacitor is connected to a first end of the third inductor, a first end of the filtering capacitor, the eleventh resistor and a positive pole of the LED load, a second end of the filtering capacitor and the eleventh resistor are connected to a negative pole of the LED load, a center terminal of the third inductor is connected to a first end of the ninth resistor and a positive pole of the fifth diode, a second end of the ninth resistor is connected to the eighth pin of the chip, a negative pole of the fifth diode is connected to a first end of the tenth resistor, a second end of the tenth resistor is connected to the start branch and the first pin of the chip, the second pin of the chip is grounded, the third pin of the chip and the fourth pin of the chip are connected to a second end of the sixth capacitor, two ends of the fifth capacitor are respectively connected to the seventh pin of the chip and ground, the sixth pin of the chip and the fifth pin of the chip are connected and connected to a first end of the parallel resistor array and a negative pole of the free-wheeling diode, a positive pole of the free-wheeling diode is grounded, a second end of the parallel resistor array is connected to a second end of the third inductor.

7. The LED drive circuit with leakage protection and ballast compatibility according to claim 1, wherein the compatibility and leakage protection circuit further comprises a clamping diode with a positive pole and a negative pole respectively connected to the third connector and the fourth connector.

8. The LED drive circuit with leakage protection and ballast compatibility according to claim 1, wherein the first filtering circuit comprises a second capacitor and a fuse, the input power has an L port and an N port, a first end of the fuse is connected to the L port of the input power, a second end of the fuse is connected to a first end of the second capacitor and the second rectifying input, a second end of the second capacitor is connected to the N port of the input power and the first rectifying input.

9. The LED drive circuit with leakage protection and ballast compatibility according to claim 1, wherein the second filtering circuit comprises a first inductor, a seventh resistor, a third capacitor, a second inductor and an eighth resistor, the seventh resistor is parallel connected to the first inductor and a first end of the first inductor is connected to the second rectifying output, a second end of the first inductor is connected to the input of the power module, a first end of the third capacitor is connected to the second end of the first inductor, the second inductor is parallel connected to the eighth resistor and a first end of the second inductor is connected to a second end of the third capacitor, a second end of the second inductor is connected to the first inductor by a fourth capacitor and is directly connected to the fourth connector.

10. The LED drive circuit with leakage protection and ballast compatibility according to claim 1, wherein the power module comprises a chip, a start branch, a fifth capacitor, a sixth capacitor, a free-wheeling diode, a parallel resistor array, a third inductor, a ninth resistor, a tenth resistor, a fifth diode, a filtering capacitor and an eleventh resistor; the chip has a first pin, a second pin, a third pin, a fourth pin, a fifth pin, a sixth pin, a seventh pin and an eighth pin; a first end of the start branch is connected to the output of the second filtering circuit and the sixth capacitor, a second end of the start branch is grounded, a first end of the sixth capacitor is connected to a first end of the third inductor, a first end of the filtering capacitor, the eleventh resistor and a positive pole of the LED load, a second other end of the filtering capacitor and the eleventh resistor are connected to a negative pole of the LED load, a center terminal of the third inductor is connected to a first end of the ninth resistor and a positive pole of the fifth diode, a second end of the ninth resistor is connected to the eighth pin of the chip, a negative pole of the fifth diode is connected to a first end of the tenth resistor, a second end of the tenth resistor is connected to the start branch and the first pin of the chip, the second pin of the chip is grounded, the third pin of the chip and the fourth pin of the chip are connected to a second end of the sixth capacitor, two ends of the fifth capacitor are respectively connected to the seventh pin of the chip and ground, the sixth pin of the chip and the fifth pin of the chip are connected and connected to a first end of the parallel resistor array and a negative pole of the free-wheeling diode, a positive pole of the free-wheeling diode is grounded, a second end of the parallel resistor array is connected to a second end of the third inductor.

* * * * *